(12) United States Patent
Katoh et al.

(10) Patent No.: US 11,677,340 B2
(45) Date of Patent: Jun. 13, 2023

(54) MOTOR DRIVE DEVICE AND MOTOR DRIVE METHOD

(71) Applicant: TOYOTA JIDOSHA KABUSHIKI KAISHA, Aichi-ken (JP)

(72) Inventors: Hidetoshi Katoh, Toyota (JP);
Masayuki Yoshikawa, Toyota (JP);
Kenichi Ichinose, Toyota (JP);
Hiroyuki Nishimura, Toyota (JP);
Kazuhisa Ori, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 45 days.

(21) Appl. No.: 17/090,832

(22) Filed: Nov. 5, 2020

(65) Prior Publication Data

US 2021/0194396 A1    Jun. 24, 2021

(30) Foreign Application Priority Data

Dec. 24, 2019 (JP) .............................. JP2019-233512
Jul. 27, 2020 (JP) .............................. JP2020-126877

(51) Int. Cl.
*H02P 5/74* (2006.01)
*H02K 11/02* (2016.01)
*H02P 23/14* (2006.01)
*H02K 7/00* (2006.01)

(52) U.S. Cl.
CPC .............. *H02P 5/74* (2013.01); *H02K 7/006* (2013.01); *H02K 11/02* (2013.01); *H02P 23/14* (2013.01)

(58) Field of Classification Search
CPC .......... H02P 5/74; H02P 23/14; H02P 27/085; H02P 5/46; H02K 7/006; H02K 11/02; B60L 15/20; B60L 2220/42; B60L 2240/26; B60L 2240/421; B60L 2240/423; B60L 2240/642; B60L 2250/26; B60L 2260/28; B60L 2260/50; B60L 2270/147; B60L 15/08; Y02T 10/64; Y02T 10/72; Y02T 90/16
See application file for complete search history.

(56) References Cited

U.S. PATENT DOCUMENTS

| | | | | |
|---|---|---|---|---|
| 2007/0298928 A1* | 12/2007 | Yamanaka | ............. | B60K 6/448 477/15 |
| 2009/0115362 A1* | 5/2009 | Saha | ....................... | B60K 6/26 180/65.285 |
| 2020/0307545 A1* | 10/2020 | Park | ....................... | F16H 61/16 |

FOREIGN PATENT DOCUMENTS

JP        2006288100 A     10/2006

* cited by examiner

*Primary Examiner* — Muhammad S Islam
*Assistant Examiner* — Bradley R Brown
(74) *Attorney, Agent, or Firm* — Hauptman Ham, LLP

(57) ABSTRACT

A motor drive device that includes: a power control unit that drives a motor, which configures a motive power source of a moving body, by supplying a drive signal modulated according to a carrier frequency; a memory; and a processor that is coupled to the memory, the processor being configured to: predict torque demand on the motor, and change the carrier frequency of the power control unit in a case in which an increase in the torque demand on the motor has been predicted.

18 Claims, 18 Drawing Sheets

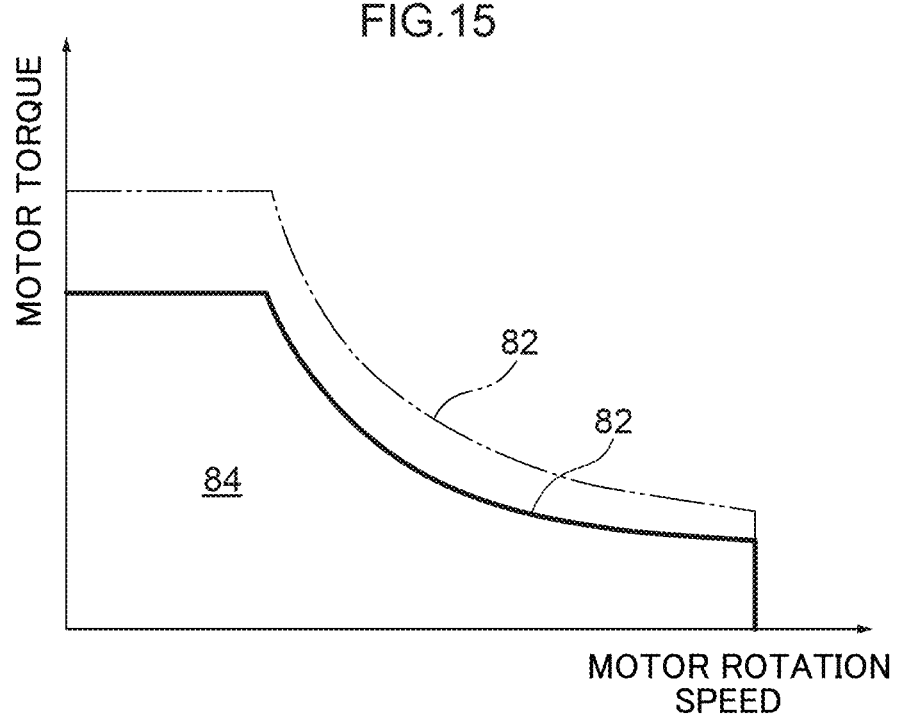

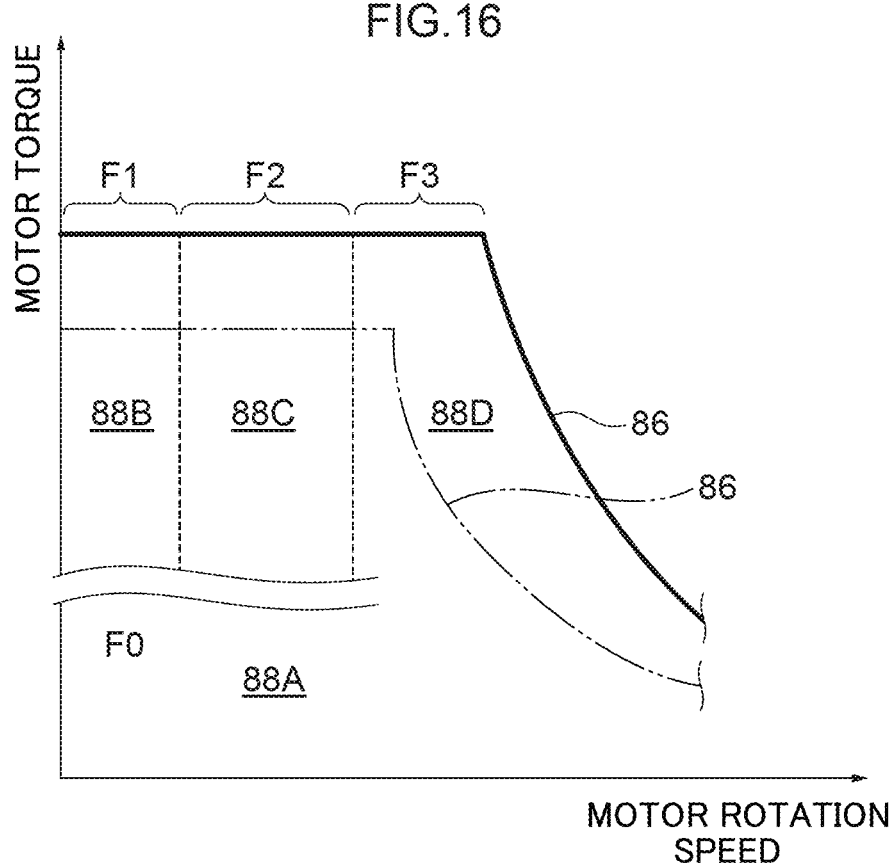

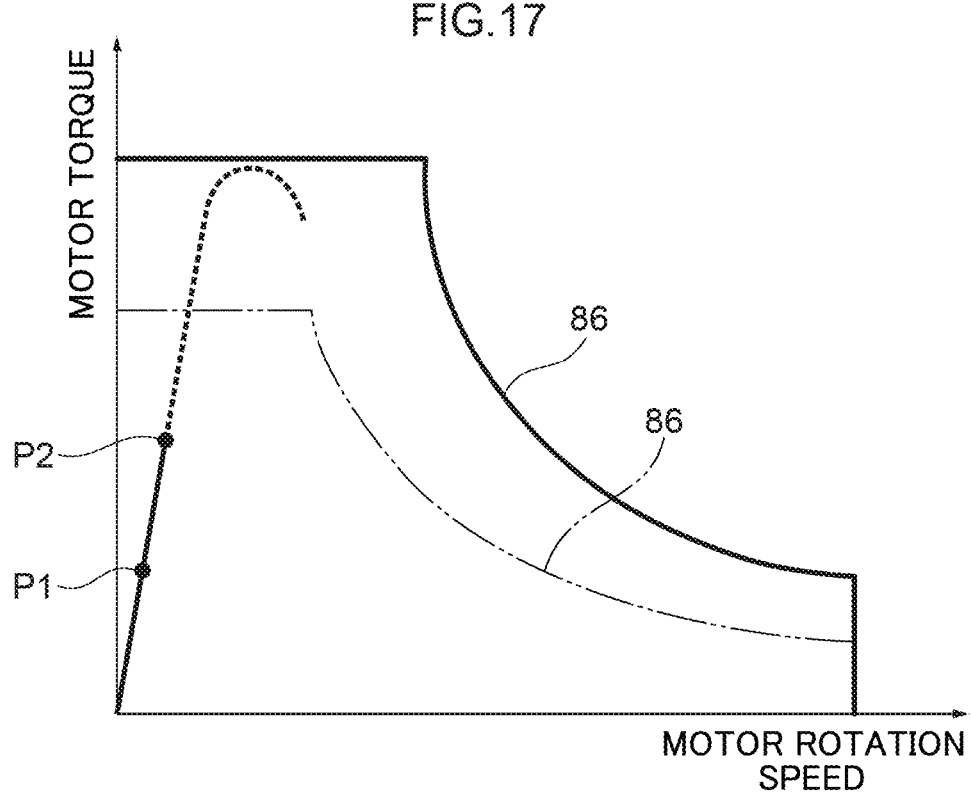

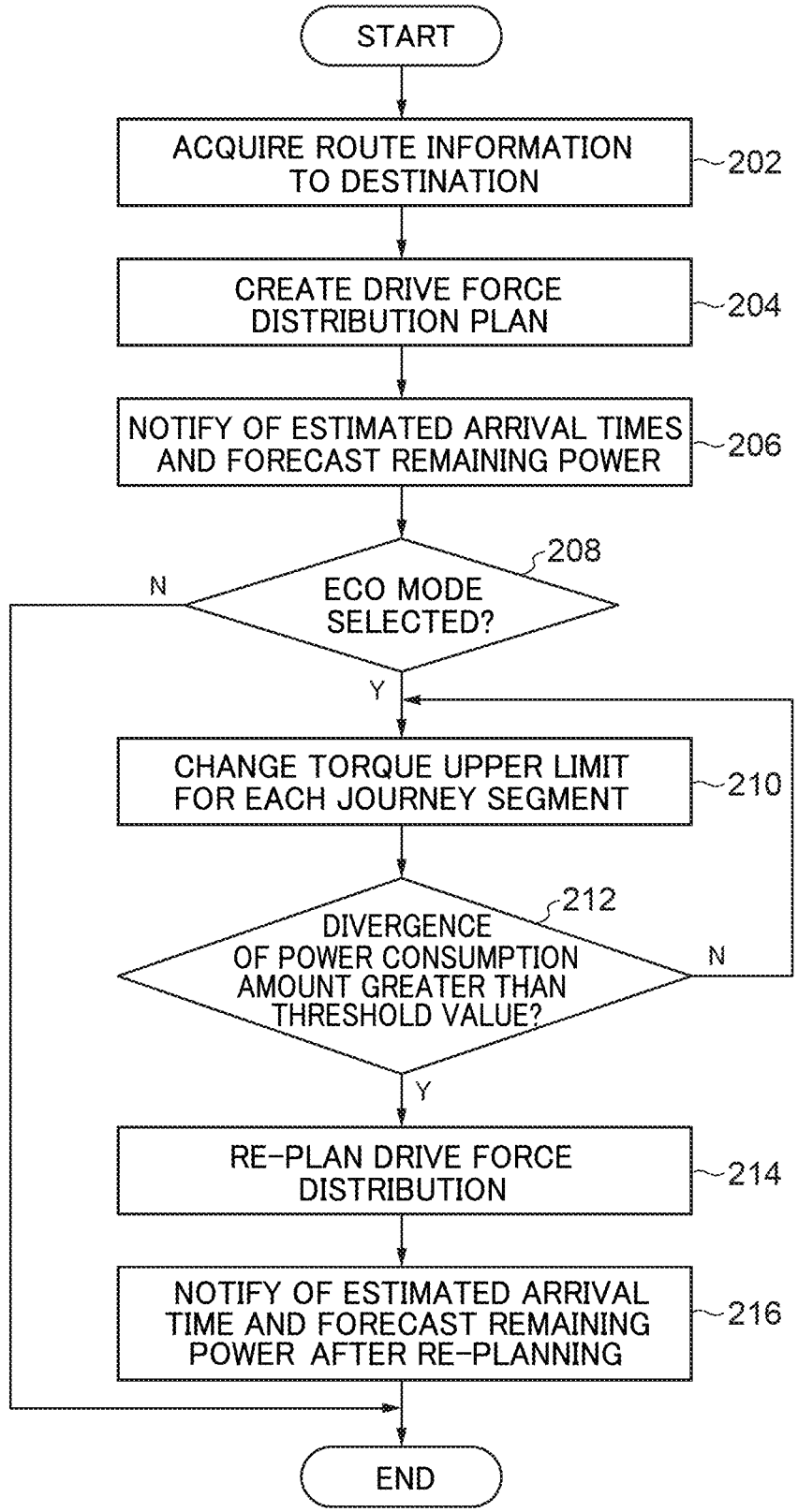

MOTOR DRIVE DEVICE AND MOTOR DRIVE METHOD

CROSS-REFERENCE TO RELATED APPLICATION

This application is based on and claims priority under 35 USC 119 from Japanese Patent Applications No. 2019-233512 filed on Dec. 24, 2019 and No. 2020-126877 filed on Jul. 27, 2020, the disclosures of which are incorporated by reference herein.

BACKGROUND

Technical Field

The present disclosure relates to a motor drive device and a motor drive method.

Related Art

Japanese Patent Application Laid-Open (JP-A) No. 2006-288100 describes technology in which, out of the electromagnetic interference (EMI) noise (also referred to as electromagnetic wave noise) generated from a motor drive system, a frequency value of undesirable EMI noise is set, and a carrier frequency is selected so as not to generate a carrier frequency of the set frequency value.

For example, in cases in which a vehicle comes onto a road with a steep upward gradient, a motor serving as a motive power source of the vehicle is required to generate a large torque momentarily. In the technology disclosed in JP-A No. 2006-288100, the carrier frequency might not be changed in time when the motor is required to generate a large torque momentarily. This could result in the generation of EMI noise, potentially leading to issues such as a negative impact on other equipment.

SUMMARY

An aspect of the present disclosure is a motor drive device that includes: a power control unit that drives a motor, which configures a motive power source of a moving body, by supplying a drive signal modulated according to a carrier frequency; a memory; and a processor that is coupled to the memory, the processor being configured to: predict torque demand on the motor, and change the carrier frequency of the power control unit in a case in which an increase in the torque demand on the motor has been predicted.

BRIEF DESCRIPTION OF DRAWINGS

FIG. 15 is a line diagram illustrating a drive region of a first MG of the third exemplary embodiment;

FIG. 16 is a line diagram illustrating a drive region of a second MG of the third exemplary embodiment;

FIG. 17 is a line diagram to explain processing to estimate a peak position of torque demand on a second MG; and FIG. 18 is a flowchart illustrating an example of a flow of driving mode change processing.

DESCRIPTION OF EMBODIMENTS

Detailed explanation follows regarding examples of exemplary embodiments of the present disclosure, with reference to the drawings.

First Exemplary Embodiment

Figure 1:
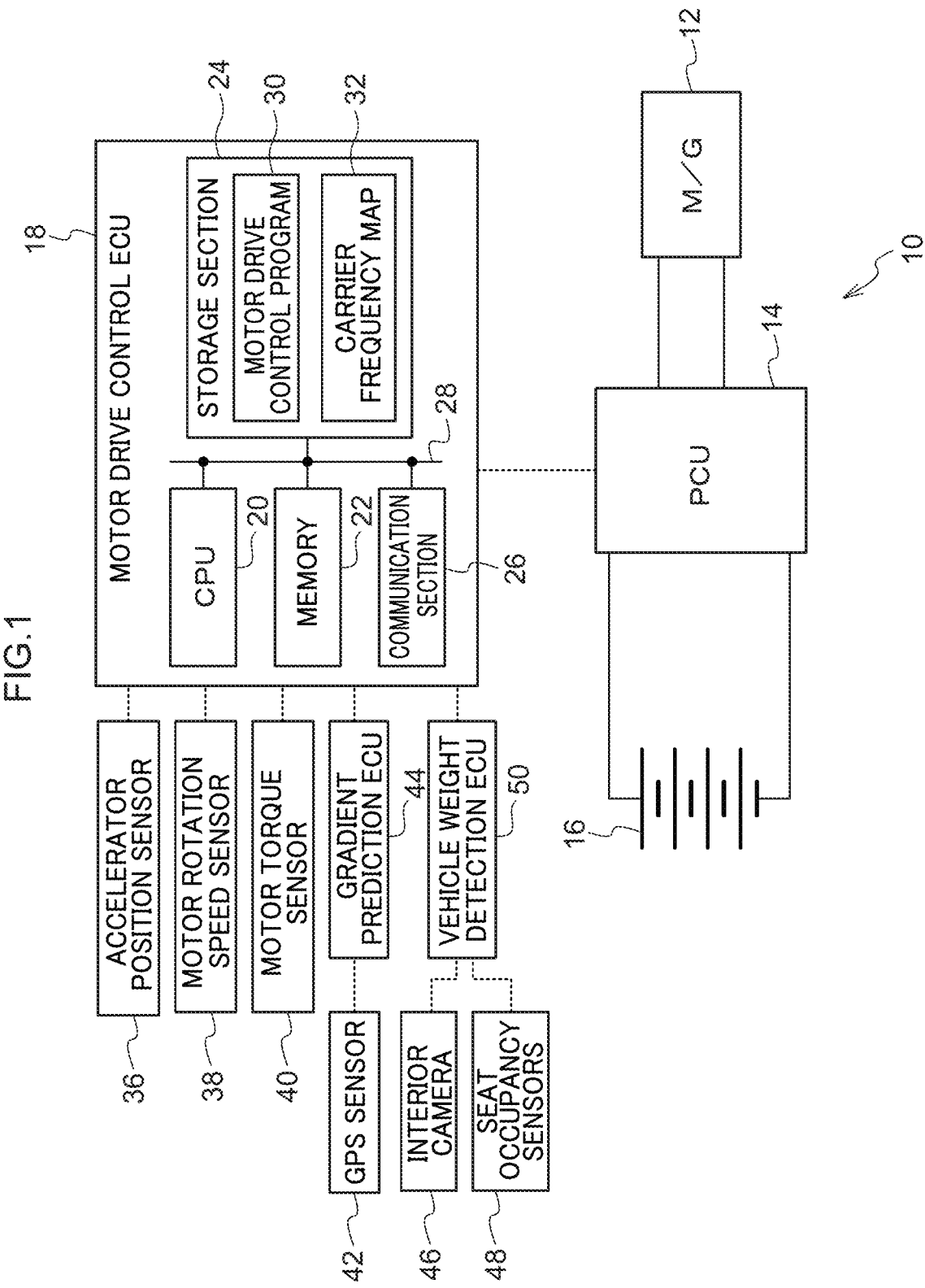
FIG. 1 is a block diagram illustrating a schematic configuration of a motor drive system according to a first exemplary embodiment.

As illustrated in FIG. 1, a motor drive system 10 includes a motor-generator (hereafter referred to as MG) 12, a power control unit (hereafter referred to as PKU) 14, and a battery 16. The MG 12 is installed in a vehicle serving as an example of a moving body, operates as a motor serving as a motive power source for vehicle travel, and also operates as a generator. The battery 16 is connected to the PCU 14, and the MG 12 is also connected to the PCU 14. Note that the MG 12 is an example of a motor.

The PCU 14 includes an inverter that is capable of converting DC power to AC power, and of converting AC power to DC power. When the MG 12 is operating as a motor, power from the battery 16 is supplied to the MG 12 via the PCU 14. When this is performed, the PCU 14 drives the MG 12 by supplying the MG 12 with a drive signal modulated according to a carrier frequency input by a motor drive control ECU 18, described later. The MG 12 is an example of a motor, and the PCU 14 is an example of a drive section. Note that when the MG 12 is operating as a generator, power generated by the MG 12 is supplied to the battery 16 via the PCU 14 in order to charge the battery 16.

The motor drive control ECU 18 is connected to the PCU 14. An accelerator position sensor 36, a motor rotation speed sensor 38, a motor torque sensor 40, a gradient prediction ECU 44, and a vehicle weight detection ECU 50 are connected to the motor drive control ECU 18. Note that the PCU 14 and the motor drive control ECU 18 configure an example of a motor drive device.

The accelerator position sensor 36 detects the position of an accelerator pedal (accelerator position) of the vehicle. The motor rotation speed sensor 38 detects the rotation speed of an output shaft of the MG 12. The motor torque sensor 40 detects the torque generated by the output shaft of the MG 12. A global positioning system (GPS) sensor 42 that detects the current position of the vehicle is connected to the gradient prediction ECU 44. The gradient prediction ECU 44 predicts the gradient of a road that the vehicle is about to travel on by referencing the current position of the vehicle, as detected by the GPS sensor 42, against map information.

At least one out of an interior camera 46 that images the interior of the vehicle, or seat occupancy sensors 48 provided to each seat in the vehicle, is connected to the vehicle weight detection ECU 50. The vehicle weight detection ECU 50 detects the weight of vehicle based on the number of occupants in the vehicle as detected by the at least one out of the interior camera 46 or the seat occupancy sensors 48. Note that another parameter, such as the stroke of the vehicle suspension, may also be employed to detect the weight of the vehicle.

The motor drive control ECU 18 includes a central processing unit (CPU) 20 serving as an example of a hardware processor, memory 22 such as read only memory (ROM) or random access memory (RAM), a non-volatile storage section 24 such as a hard disk drive (HDD) or a solid state drive (SSD), and a communication section 26. The CPU 20, the memory 22, the storage section 24, and the communication section 26 are connected together so as to be capable of communicating with each other through an internal bus 28.

Figure 2:
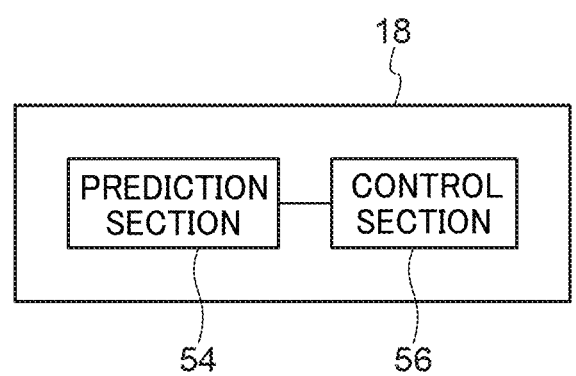
FIG. 2 is a functional block diagram of a motor drive control ECU of the first exemplary embodiment.

A motor drive control program 30 and a carrier frequency map 32 are stored in the storage section 24 of the motor drive control ECU 18. The motor drive control program 30 is read from the storage section 24 and expanded in the memory 22, and the motor drive control program 30 expanded in the memory 22 is then executed by the CPU 20. The motor drive control ECU 18 thereby functions as a prediction section 54 and a control section 56 as illustrated in FIG. 2 in order to perform motor drive control processing, described later.

The prediction section 54 predicts the torque demand on the MG 12 based on an operation history of the MG 12, the accelerator position detected by the accelerator position sensor 36, the gradient of the road that the vehicle is about to travel on as detected by the gradient prediction ECU 44, and the vehicle weight detected by the vehicle weight detection ECU 50. The control section 56 changes the carrier frequency of the PCU 14 in cases in which an increase in the torque demand on the MG 12 has been predicted by the prediction section 54.

Figure 3:
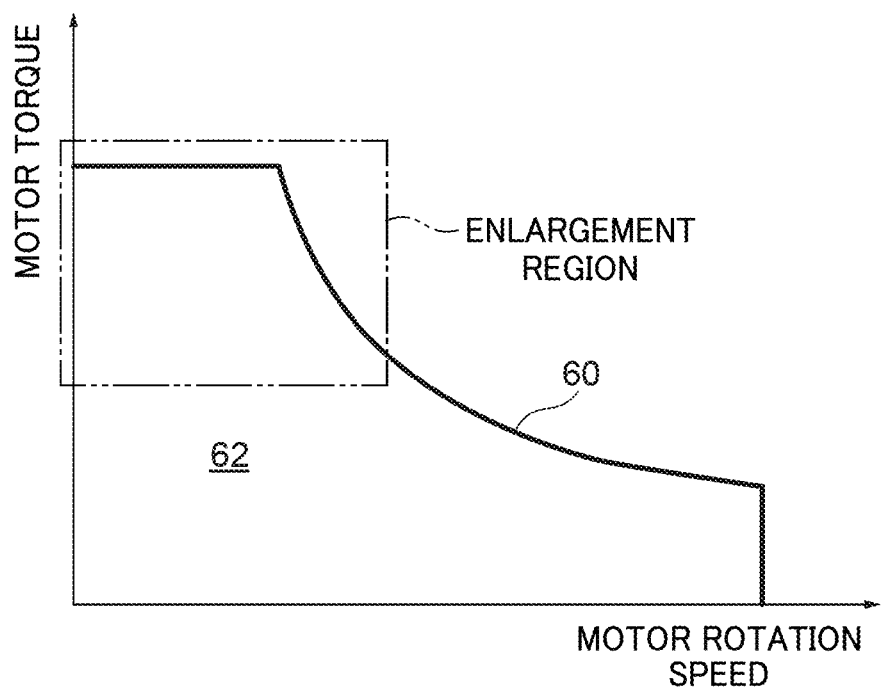
FIG. 3 is a line diagram illustrating an (entire) drive region of a motor-generator (MG)
Figure 4:
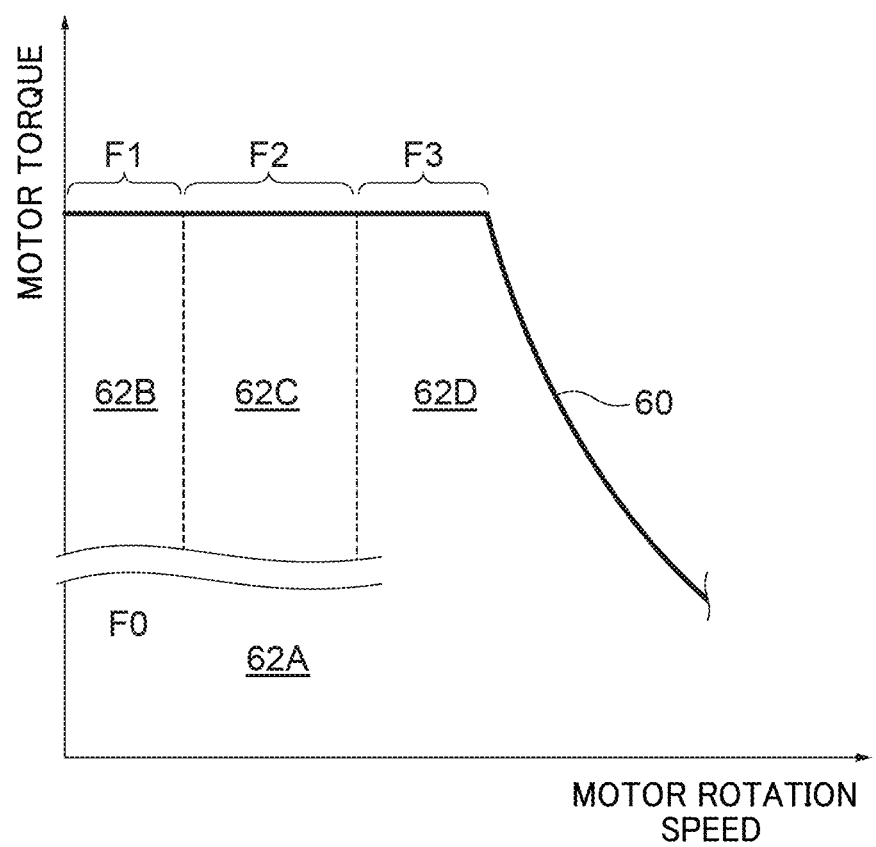
FIG. 4 is a line diagram illustrating the enlargement region of the MG drive region illustrated in FIG. 3.

In the present exemplary embodiment, as illustrated in FIG. 3 and FIG. 4, a drive region 62 of the MG 12 as defined by a torque curve 60 expressing a relationship between rotation speed and torque of the MG 12 is divided into plural sub-regions. A carrier frequency is pre-set for each of the divided regions. Specifically, a low torque region of the drive region of the MG 12 where the torque is less than a predetermined value configures one sub-region 62A (see FIG. 4). A carrier frequency F0 is set for this sub-region in consideration of the temperature, power consumption efficiency, and so on of the PCU 14 and the MG 12.

Of the drive region of the MG 12, a high torque region where the torque is a predetermined value or greater is divided into plural (for example three) sub-regions 62B, 62C, and 62D arranged along an axis representing the rotation speed of the MG 12. In consideration of EMI noise and so on, a carrier frequency F1 is pre-set for the sub-region 62B, a carrier frequency F2 is pre-set for the sub-region 62C, and a carrier frequency F3 is pre-set for the sub-region 62D. Note that a size relationship of the carrier frequencies F1, F2, F3 is set such that F1<F2<F3. The carrier frequency map 32 includes information expressing boundary positions between the plural sub-regions in the drive region of the MG 12, and information expressing the carrier frequency set for each of the divided regions.

Figure 5:
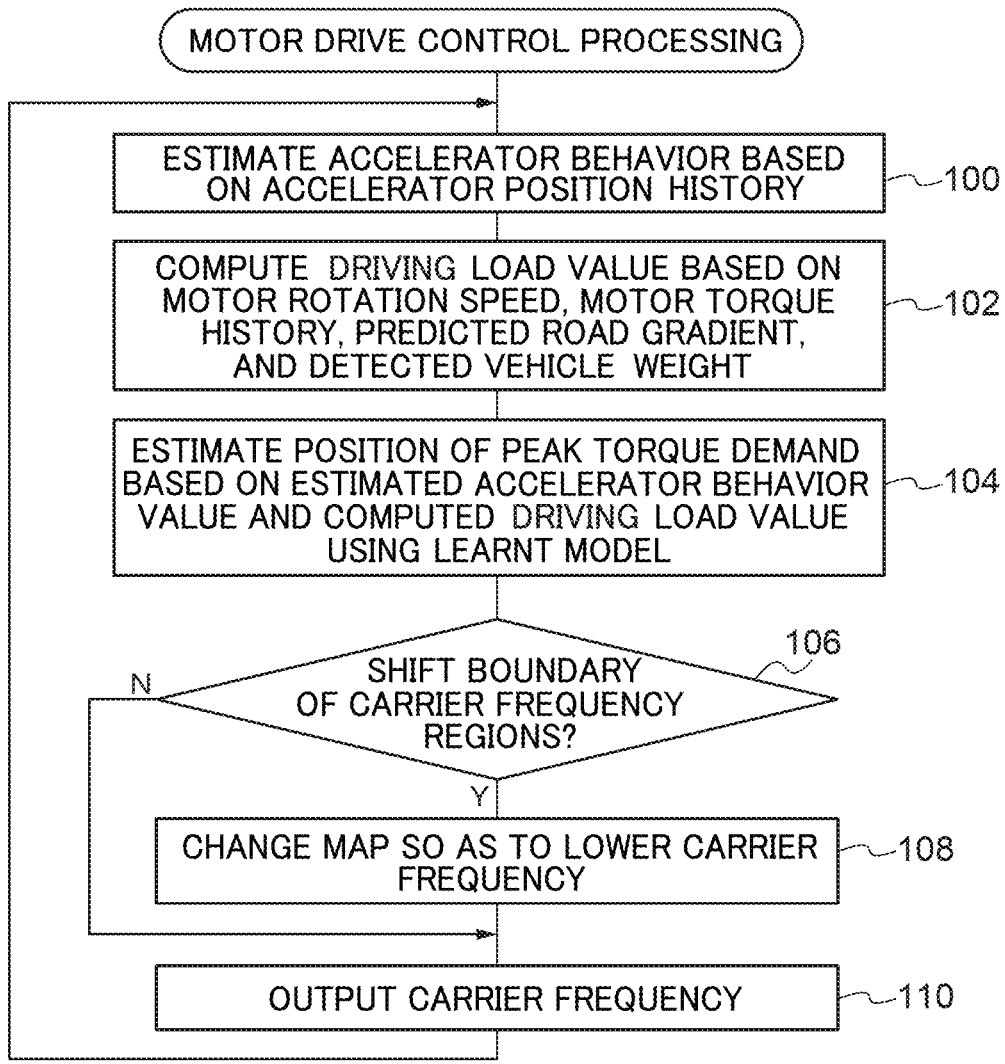
FIG. 5 is a flowchart illustrating motor drive control processing.

Explanation follows regarding operation of the first exemplary embodiment. The motor drive control ECU 18 performs the motor drive control processing illustrated in FIG. 5 while the ignition switch of the vehicle is on and the MG 12 is operating as a motor.

Figure 6:
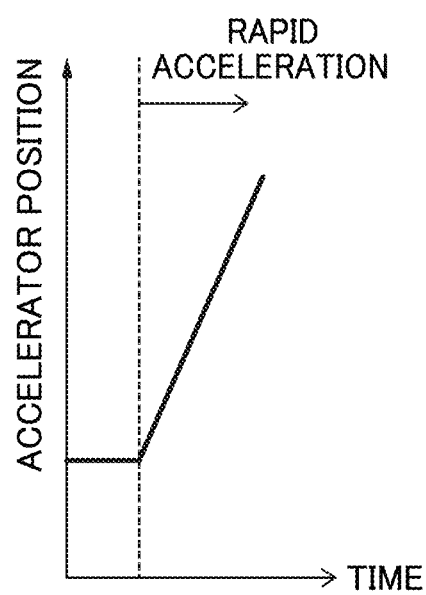
FIG. 6 is a line diagram illustrating an example of an accelerator position history.

At step 100 of the motor drive control processing, the prediction section 54 acquires the accelerator position detected by the accelerator position sensor 36, and estimates accelerator behavior, indicating upcoming transitions in the accelerator position, by extrapolation or the like based on the acquired accelerator position history (an example of which is illustrated in FIG. 6).

At step 102, the prediction section 54 respectively acquires the rotation speed of the output shaft of the MG 12 as detected by the motor rotation speed sensor 38, the torque generated by the output shaft of the MG 12 as detected by the motor torque sensor 40, the road gradient predicted by the gradient prediction ECU 44, and the vehicle weight detected by the vehicle weight detection ECU 50. Employing a prediction formula created in advance, for example, the prediction section 54 then computes an estimated travel load value indicating upcoming transitions in the travel load of the vehicle based on the acquired rotation speed and torque generation histories of the MG 12, as well as the predicted road gradient and the detected vehicle weight. Note that the rotation speed and the torque generation histories of the MG 12 are examples of motor operation history.

Figure 7:
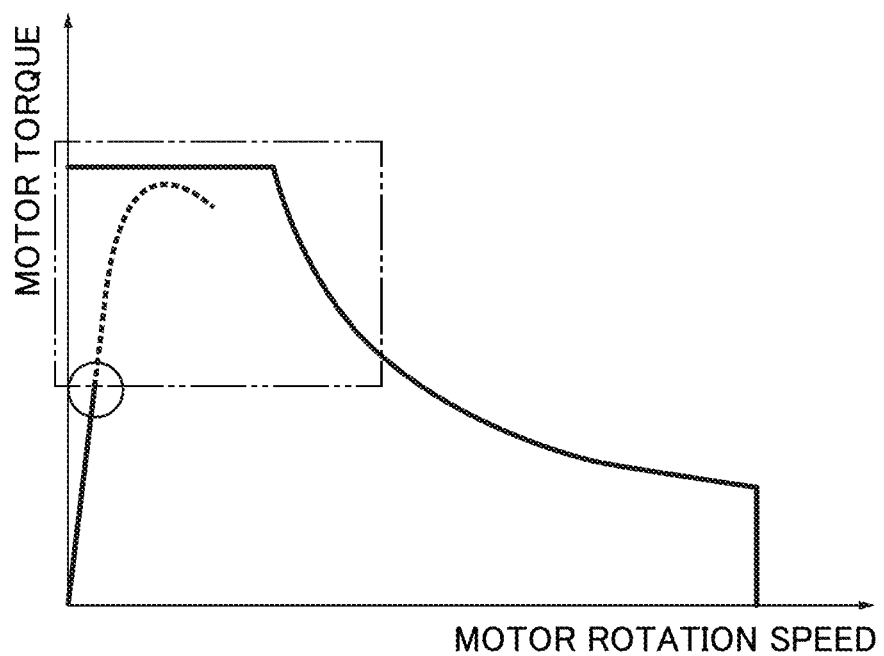
FIG. 7 is a line diagram to explain processing to estimate a peak position of torque demand on a MG.

At step 104, the prediction section 54 predicts a transition in the torque demand on the MG 12 in the drive region of the MG 12 based on the estimated accelerator behavior value obtained at step 100 and the estimated travel load value obtained at step 102, and estimates the position of a peak in the torque demand (see FIG. 7). The peak position of the torque demand on the MG 12 may for example be estimated using a pre-learnt model created in advance by machine learning. The pre-learnt model may for example by created using learning data in which past estimated values for accelerator behavior and past estimated values for travel load are input, and the past rotation speed and torque generation histories of the MG 12 are output.

At step 106, based on the peak position of the torque demand on the MG 12 estimated during the processing of step 104 the control section 56 determines whether or not to shift a boundary position between the plural sub-regions (the regions set with different carrier frequencies) set in the high torque region of the drive region of the MG 12.

Note that negative determination is made at step 106 in cases in which the peak torque demand on the MG 12 does not reach the high torque region of the drive region of the MG 12, and also in cases in which the peak torque demand on the MG 12 does reach the high torque region of the drive region of the MG 12 but does not span a boundary between the sub-regions. In such cases, processing transitions to step 110 without shifting the boundary positions of the sub-regions.

Figure 8:
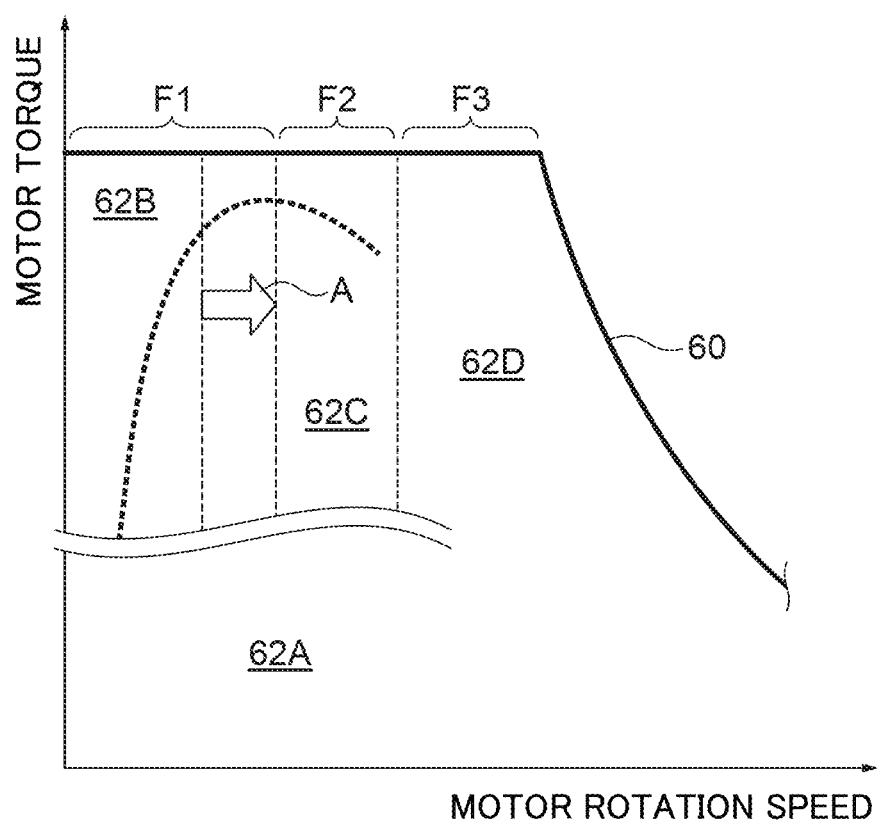
FIG. 8 is a line diagram to explain processing to shift a boundary position between sub-regions along an axis representing the rotation speed of a MG.

As illustrated in the example in FIG. 8, affirmative determination is made at step 106 and processing transitions to step 108 in cases in which the peak torque demand on the MG 12 does reach the high torque region of the drive region of the MG 12, and this peak also spans a boundary between sub-regions (straddles the sub-region 62B and the sub-region 62C in FIG. 8).

At step 108, the control section 56 changes the carrier frequency map 32 so as to lower the carrier frequency at the peak torque demand on the MG 12 (such that the carrier frequency after the change is a carrier frequency at which EMI noise from the MG 12 is less liable to be generated compared to the carrier frequency before the change). As illustrated in the example in FIG. 8, the position of the boundary between the sub-region 62B with the carrier frequency F1 and the sub-region 62C with the carrier frequency F2 is shifted along the axis representing the rotation speed of the MG 12, such that the carrier frequency at the peak torque demand on the MG 12 is switched from the carrier frequency F2 to the carrier frequency F1 (see the arrow A).

Note that although the purpose of changing the carrier frequency by shifting the boundary position between sub-regions as described above is to lower the EMI noise, the position of peak EMI noise might be slightly offset from the position of the peak torque demand on the MG 12. Thus, in order to lower the carrier frequency at the position of peak EMI noise from the MG 12, the carrier frequency map 32 is preferably changed so as to lower the carrier frequency in a range including predetermined ranges before and after a reference position corresponding to the peak torque demand on the MG 12.

At step 110, the control section 56 reads the carrier frequency for the combination of the current rotation speed and torque of the MG 12 from the carrier frequency map 32, and outputs the carrier frequency read from the carrier frequency map 32 to the PCU 14. The PCU 14 accordingly drives the MG 12 by supplying the MG 12 with a drive signal modulated according to the input carrier frequency.

The processing returns to step 100 after the processing of step 110 has been performed. Thus, the above-described processing of step 100 to step 110 is performed repeatedly while the MG 12 is operating as a motor. In cases in which the peak torque demand on the MG 12 is predicted to reach the high torque region and this peak is also predicted to span a boundary between the sub-regions, the position of this boundary between the sub-regions is shifted so as to lower the carrier frequency at the peak, thereby enabling the generation of EMI noise to be suppressed.

Second Exemplary Embodiment

Next, explanation follows regarding a second exemplary embodiment of the present disclosure. Note that the second exemplary embodiment has the same configuration as the first exemplary embodiment, and so the same reference numerals are allocated to equivalent elements, and explanation of the configuration thereof is omitted.

The first exemplary embodiment explains an implementation in which a boundary position between sub-regions is shifted so as to lower the carrier frequency at the peak in cases in which a first condition is satisfied, this condition being that "the peak torque demand on the MG 12 is predicted to reach the high torque region and this peak is also predicted to span a boundary between the sub-regions".

By contrast, in addition to the first condition, the control section 56 according to the second exemplary embodiment also makes affirmative determination at step 106 in cases in which a second condition is satisfied, this condition being that "the peak torque demand on the MG 12 is predicted to reach the high torque region and an occupant is sitting at a position close to a source of EMI noise generation". A boundary position between the sub-regions is thereby shifted so as to lower the carrier frequency at the peak torque demand on the MG 12.

Figure 9:
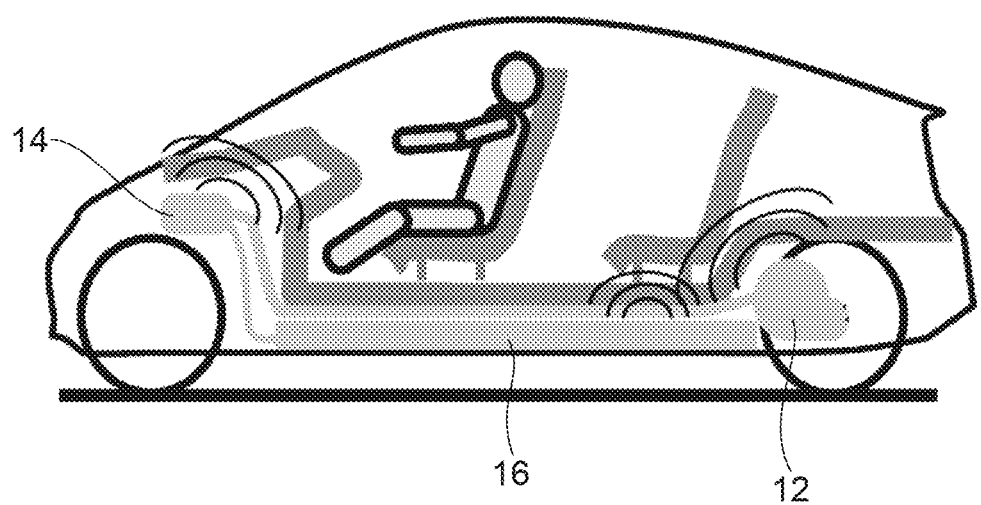
FIG. 9 is a schematic diagram of a vehicle applied with a motor drive system according to a second exemplary embodiment, illustrating a state in which an occupant is not seated in a rear seat of the vehicle.

As illustrated in the example in FIG. 9, the battery 16 is disposed below the floor of a vehicle V, the PCU 14 is disposed under the bonnet of the vehicle V, and the MG 12 is disposed at a position to drive rear wheels 66 of the vehicle V. In this configuration, electromagnetic waves are respectively emitted from the battery 16, the PCU 14, and the MG 12 while the vehicle V is traveling. The rear seats of the vehicle V are closer than the front seats to the sources of EMI noise generation (the MG 12 and so on).

Figure 10:
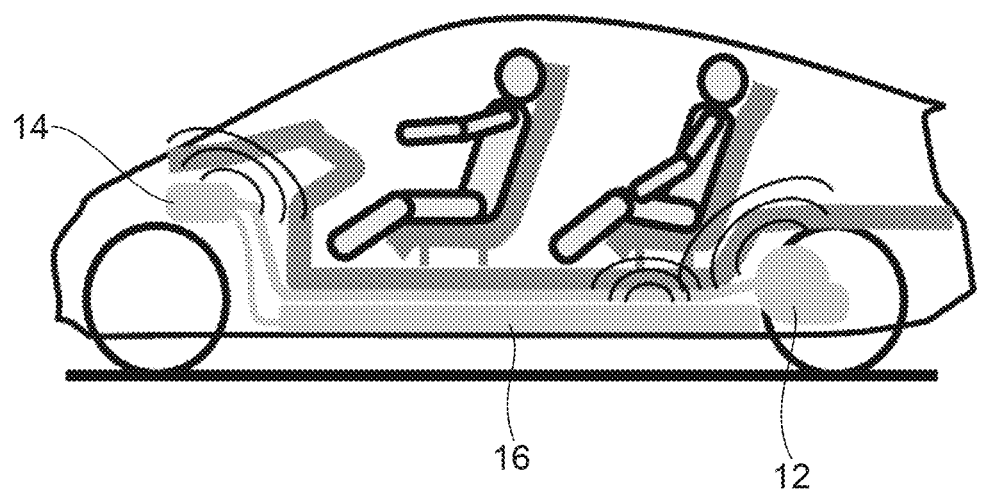
FIG. 10 is a schematic diagram illustrating a state in which occupants are seated in a front seat and a rear seat of a vehicle.

Thus, in the second exemplary embodiment, a seating plan of occupants inside the cabin of the vehicle is acquired from the vehicle weight detection ECU 50. In cases in which an occupant is seated in a rear seat of the vehicle V (see FIG. 10), the second condition described above is satisfied when the peak torque demand on the MG 12 is predicted to reach the high torque region, and so the boundary position between the corresponding sub-regions is shifted so as to lower the carrier frequency at the peak torque demand on the MG 12. This enables the effect of EMI noise on the occupant seated in the rear seat of the vehicle V that is close to the sources of EMI noise generation to be suppressed.

In cases in which no occupants are seated in the rear seats of the vehicle V (see FIG. 9), the second condition described above is not satisfied even if the peak torque demand on the MG 12 is predicted to reach the high torque region, and so the boundary position between the corresponding sub-regions is not shifted.

As described above, in the above exemplary embodiments the PCU 14 supplies a drive signal modulated according to the carrier frequency so as to drive the MG 12 serving as a motive power source of the vehicle, and the prediction section 54 predicts the torque demand on the MG 12. The control section 56 changes the carrier frequency of the PCU 14 in cases in which an increase in the torque demand on the MG 12 has been predicted by the prediction section 54. This enables the carrier frequency to be reliably changed when an increase in the torque demand on the MG 12 arises, such as when the vehicle moves off suddenly or when the vehicle comes onto a road with a steep gradient.

In the above exemplary embodiments, in cases in which an increase in the torque demand on the MG 12 has been predicted by the prediction section 54 the control section 56 changes the carrier frequency to a carrier frequency at which EMI noise from the MG 12 is less liable to be generated compared to the carrier frequency before the change. This enables the generation of EMI noise to be suppressed when an increase in the torque demand on the MG 12 arises.

In the above exemplary embodiments, the prediction section 54 predicts the torque demand on the MG 12 based on at least one factor out of the operation history of the MG 12, the accelerator position, the gradient of the road on which the vehicle is about to travel, or the vehicle weight. This enables the accuracy with which the torque demand on the MG 12 is predicted to be improved.

In the above exemplary embodiments, the prediction section 54 predicts a transition in the torque demand on the MG 12 within the drive region of the MG 12 as defined by the torque curve expressing the relationship between rotation speed and torque of the MG 12. Within the drive region of the MG 12, at least the high torque region where the torque is the predetermined value or greater is divided into the plural sub-regions arranged along the axis representing the rotation speed of the MG 12, and a carrier frequency is pre-set for each of the sub-regions. In cases in which the peak torque demand on the MG 12 has been predicted to enter the high torque region by the prediction section 54, the control section 56 changes the carrier frequency by shifting a boundary position between the sub-regions so as to lower the carrier frequency at the peak. Lowering the carrier frequency at the peak in order to suppress EMI noise generation in cases in which the peak torque demand on the MG 12 enters the high torque region can be implemented by simple processing to shift the boundary position between the sub-regions.

In the second exemplary embodiment, the control section 56 also shifts a boundary position between the sub-regions so as to lower the carrier frequency at the peak torque demand on the MG 12 in cases in which the peak torque demand on the MG 12 is predicted to reach the high torque region and an occupant is sitting at a position close to a source of EMI noise generation. This enables the effect of EMI noise on an occupant sitting at a position close to a source of EMI noise generation to be suppressed.

Figure 11:
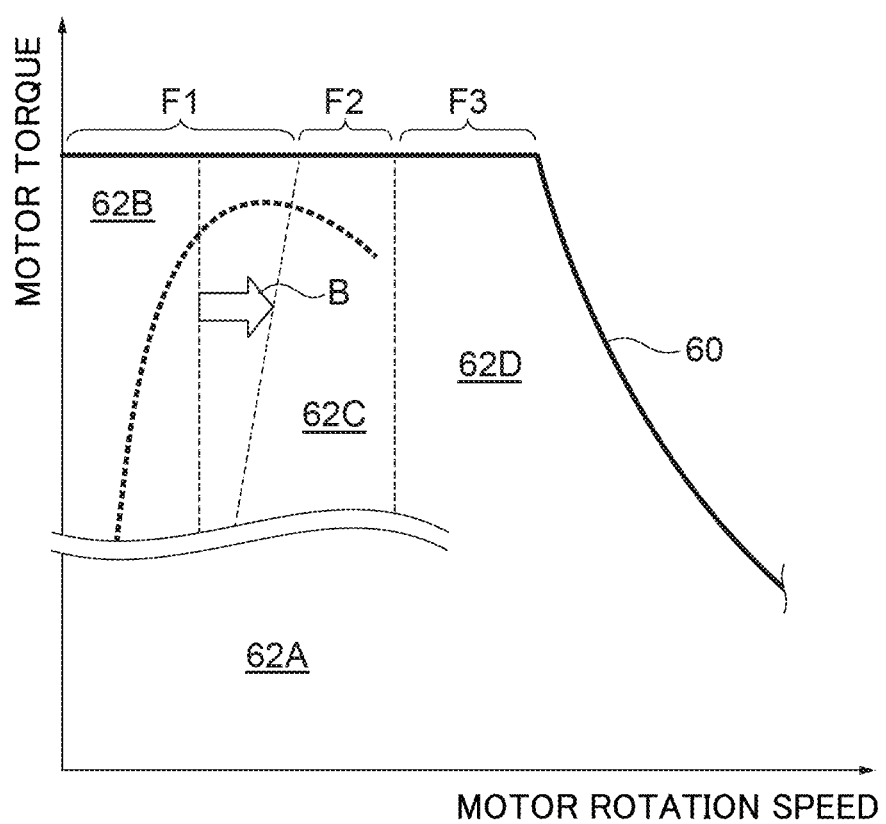
FIG. 11 is a line diagram to explain processing to shift a boundary position between sub-regions by tilting the boundary relative to an axis representing the rotation speed of a MG.

Note that in the above description, an implementation has been explained in which a boundary position between sub-regions is shifted along the axis representing the rotation speed of the MG 12 in cases in which the peak torque demand on the MG 12 is predicted to reach the high torque region and this peak is also predicted to span the boundary between the sub-regions. However, there is no limitation thereto. As illustrated by the arrow B in the example in FIG. 11, a boundary position between sub-regions may be shifted by tilting the boundary relative to the axis representing the rotation speed of the MG 12.

Note that in the above description, an implementation has been explained in which a transition in the torque demand on the MG 12 is predicted using machine learning. However, the present disclosure is not limited thereto. For example, a prediction formula to predict a transition in the torque demand on the MG 12 may be created based on at least one parameter out of various parameters such as accelerator position history, travel load of the vehicle, a limit value of the MG 12, tire rolling resistance, and vehicle cd values, and the transition in the torque demand on the MG 12 may be predicted based on this prediction formula.

In the above description, an implementation has been explained in which application is made to a vehicle serving as a moving body. However, the present disclosure is not limited thereto, and application may be made to any moving body employing a motor as a motive power source.

Third Exemplary Embodiment

Next, explanation follows regarding a motor drive system 70 according to a third exemplary embodiment, with reference to FIG. 12 to FIG. 18. Note that configuration that is similar to that of the first exemplary embodiment and second exemplary embodiment is allocated the same reference numerals, and explanation thereof is omitted as appropriate.

Figure 12:
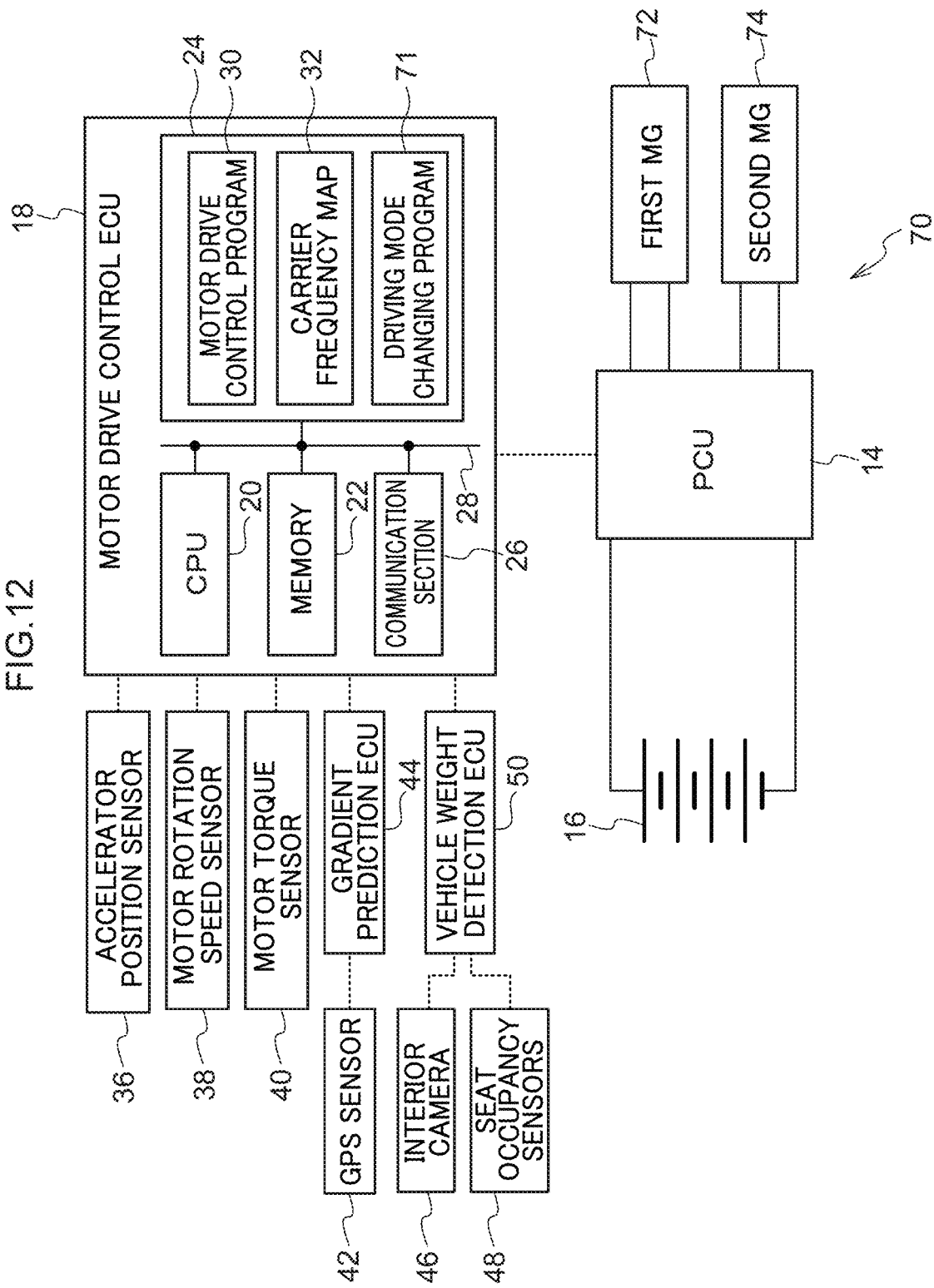
FIG. 12 is a block diagram illustrating a schematic configuration of a motor drive system according to a third exemplary embodiment.

As illustrated in FIG. 12, the motor drive system 70 according to the third exemplary embodiment includes the PCU 14, the battery 16, a first motor-generator (hereafter referred to as first MG) 72, and a second motor-generator (hereafter referred to as second MG) 74. The battery 16 is connected to the PCU 14. The first MG 72 and the second MG 74 are connected to the PCU 14. Note that the first MG 72 and the second MG 74 are examples of motors.

Figure 13:
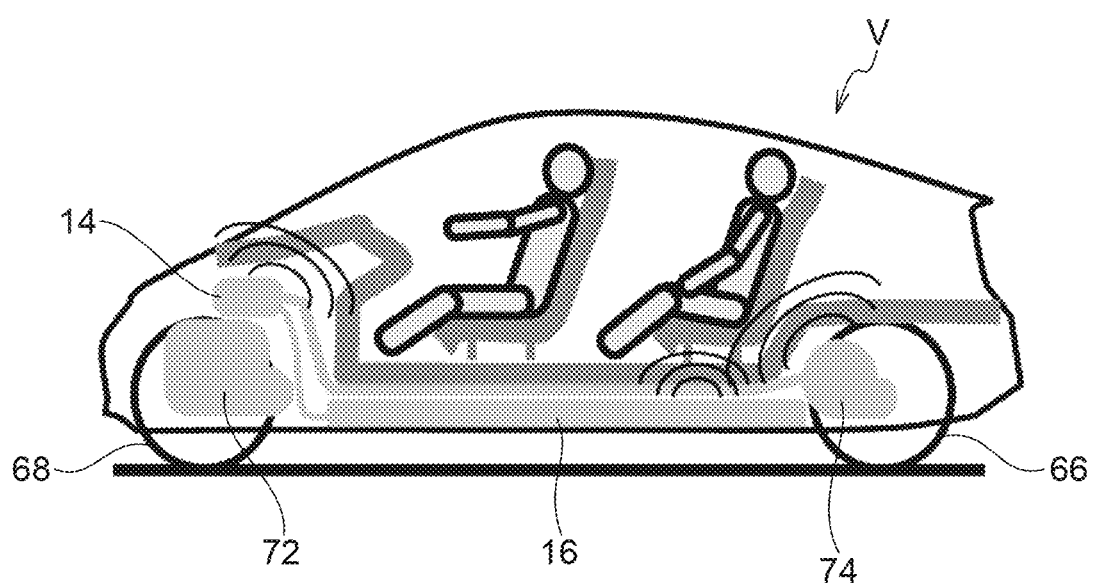
FIG. 13 is a schematic diagram of a vehicle applied with a motor drive system according to the third exemplary embodiment, illustrating a state in which occupants are seated in a front seat and a rear seat of the vehicle.

As illustrated in FIG. 13, the first MG 72 is a motive power source for front wheels 68 of a vehicle V, and is installed in a front section of the vehicle V. The second MG 74 is a motive power source for rear wheels 66 of the vehicle V, and is installed in a rear section of the vehicle V. Power is supplied from the battery 16 to the first MG 72 and the second MG 74 via the PCU 14 to drive the first MG 72 and the second MG 74. Note that as an example, the first MG 72 is a larger motor than the second MG 74 in the present exemplary embodiment. Namely, the first MG 72 is a motor with a larger output and higher motive power performance than the second MG 74. On the other hand, the second MG 74 is a motor with a smaller output and lower power consumption than the first MG 72.

The first MG 72 and the second MG 74 are connected to the PCU 14. The PCU 14 supplies the first MG 72 with a drive signal modulated according to a carrier frequency input by the motor drive control ECU 18. The PCU 14 also supplies the second MG 74 with a drive signal modulated according to a carrier frequency input by the motor drive control ECU 18. The PCU 14 drives the first MG 72 and the second MG 74 in this manner. Note that power generated by the first MG 72 and the second MG 74 is supplied to the battery 16 via the PCU 14 in order to charge the battery 16.

As illustrated in FIG. 12, the motor drive control program 30 and a driving mode changing program 71 are held in the storage section 24 of the motor drive control ECU 18. The motor drive control program 30 and the driving mode changing program 71 are loaded and executed by the CPU 20 to implement the functionality illustrated in FIG. 14.

Figure 14:
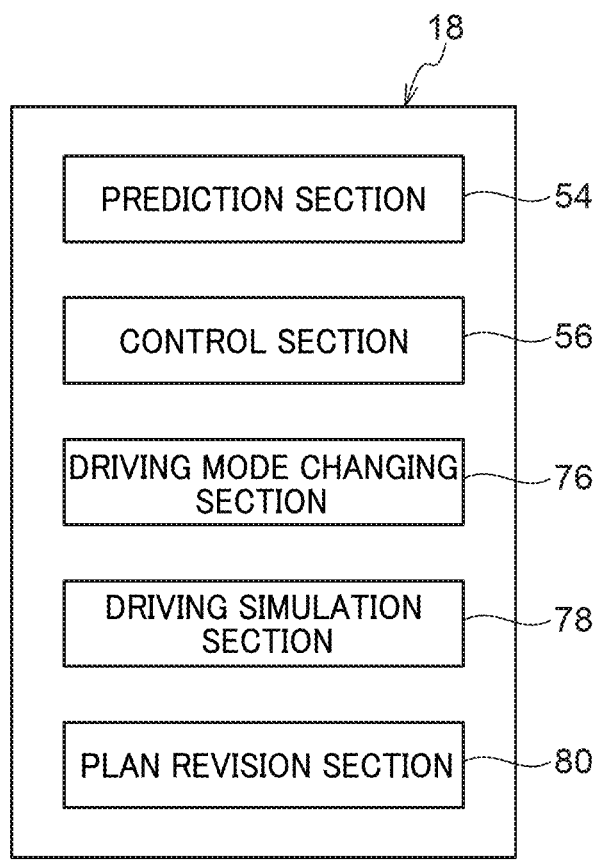
FIG. 14 is a functional block diagram of a motor drive control ECU of the third exemplary embodiment.

As illustrated in FIG. 14, the motor drive control ECU 18 is configured including a prediction section 54, a control section 56, a driving mode changing section 76, a driving simulation section 78, and a plan revision section 80 as functional configuration. The respective functional configuration is implemented by the CPU 20 reading and executing the motor drive control program 30 and the driving mode changing program 71.

The driving mode changing section 76 changes a driving mode of the vehicle V by changing a first torque curve of the first MG 72 and a second torque curve of the second MG 74. For example, the driving mode changing section 76 is configured so as to be capable of changing between three driving modes, these being a normal mode selected during normal driving, an eco mode for low power consumption, and a sports mode for increased motive power performance. The driving mode of the vehicle V is set to normal mode directly after the vehicle V has been started up.

Explanation follows regarding an example of a case in which the driving mode changing section 76 changes the driving mode from the normal mode to the eco mode. In such a case, the driving mode changing section 76 lowers a torque upper limit value of the first torque curve of the first MG 72 that has a larger output. The driving mode changing section 76 also raises a torque upper limit value of the second torque curve of the second MG 74 that has a smaller output. Lowering the torque upper limit value of the first MG 72 with a larger output and raising the torque upper limit value of the second MG 74 with a smaller output in this manner reduces the power consumption of the vehicle V during travel. Furthermore, the driving mode changing section 76 may change a drive force distribution between the first MG 72 and the second MG 74 from 50 each in the normal mode to a drive force distribution between the first MG 72 and the second MG 74 of 40 each so as to reduce the power consumption amount. Alternatively for example, the driving mode changing section 76 may apply a drive force distribution of 30 to the first MG 72 and a drive force distribution of 50 to the second MG 74 when traveling uphill in the eco mode.

As illustrated in FIG. 15, a first torque curve 82 expressing a relationship between rotation speed and torque is set for the first MG 72. The driving mode changing section 76 lowers an upper limit value of the first torque curve 82, such that the first torque curve 82 changes from the state illustrated by the double-dotted dashed line to the state illustrated by the solid line in FIG. 15. A drive region 84 of the first MG 72 is thereby reduced in size. Note that the drive region 84 of the first MG 72 is divided into plural sub-regions similarly to in the first exemplary embodiment, and a carrier frequency is pre-set for each of the divided regions.

As illustrated in FIG. 16, a second torque curve 86 expressing a relationship between rotation speed and torque is set for the second MG 74. The driving mode changing section 76 raises an upper limit value of the second torque curve 86, such that the second torque curve 86 changes from the state illustrated by the double-dotted dashed line to the state illustrated by the solid line in FIG. 16.

Note that in a state in which the driving mode of the vehicle V has been changed, a low torque region of a drive region 88 of the second MG 74 where the torque is less than a predetermined value configures a single sub-region 88A. A high torque region of the drive region 88 of the second MG 74 where the torque is a predetermined value or greater is divided into plural sub-regions arranged along an axis representing the rotation speed of the second MG 74. As an example, the high torque region is divided into three sub-regions, these being sub-regions 88B, 88C, and 88D, in the present exemplary embodiment. In consideration of EMI noise and so on, a carrier frequency F1 is pre-set for the sub-region 88B. A carrier frequency F2 is pre-set for the sub-region 88C. A carrier frequency F3 is pre-set for the sub-region 88D.

Note that when the vehicle V is traveling in the eco mode, the driving mode changing section 76 reduces power consumption by changing the first torque curve 82 and the second torque curve 86 for each journey segment. Namely, the driving mode changing section 76 changes the drive force distribution for each journey segment. For example, the driving mode changing section 76 may change the first torque curve 82 and the second torque curve 86 in consideration of the speed limit at the current position of the vehicle V as detected by the GPS sensor 42. Alternatively, the driving mode changing section 76 may change the first torque curve 82 and the second torque curve 86 in response to the gradient predicted by the gradient prediction ECU 44. Alternatively, the driving mode changing section 76 may change the first torque curve 82 and the second torque curve 86 for travel on a limited-access highway such as an expressway and for travel in an urban location.

The driving simulation section 78 illustrated in FIG. 14 creates a drive force distribution plan for traveling to a destination in the eco mode based on information registered in a navigation system or the like. The driving simulation section 78 then computes the required time to reach the destination and the power consumption required to travel to the destination based on the created drive force distribution plan. Note that as an example, the driving simulation section 78 creates the drive force distribution plan on receiving an instruction from an occupant in the present exemplary embodiment. The driving simulation section 78 also computes the required time and power consumption based on travel in the normal mode. The driving simulation section 78 then notifies the occupant of information regarding the estimated arrival time and remaining power both based on travel in the normal mode and based on travel in the eco mode. For example, such notification may be made by displaying information regarding the respective estimated arrival times and remaining power on a monitor provided inside the vehicle cabin. Alternatively, information regarding the respective estimated arrival times and remaining power may be notified using audio emitted through a speaker provided inside the vehicle cabin.

After the occupant has been notified of the information regarding the respective estimated arrival times and remaining power, the plan revision section 80 revises the drive force distribution plan in cases in which there is a large divergence from the notified information when in a state traveling in the eco mode. For example, power consumption may be greater than predicted due to acceleration or deceleration and accelerator operation by the driver. Alternatively, power consumption may be greater than predicted due to an operational state of an air conditioning unit. In such cases, the plan revision section 80 revises the drive force distribution plan to the destination, and notifies the occupant of information regarding the thus computed estimated arrival time and remaining power. Alternatively, the plan revision section 80 may be configured so as to revise the drive force distribution plan only in cases in which the remaining power would otherwise be depleted before arriving at the destination. Furthermore, the plan revision section 80 may propose that the occupant change the setting temperature of the air conditioning unit in cases in which determination has been made that the remaining power would otherwise be depleted before arriving at the destination. The plan revision section 80 may also propose that other onboard devices with large power consumptions other than the air conditioning unit be switched off in cases in which such other onboard devices are operational.

In the present exemplary embodiment, the control section 56 changes the carrier frequency of the PCU 14 in cases in which the torque demand on the first MG 72 has been predicted to increase by the prediction section 54. The control section 56 also changes the carrier frequency of the PCU 14 in cases in which the torque demand on the second MG 74 has been predicted to increase by the prediction section 54. When this is performed, the control section 56 changes the respective carrier frequencies based on the first torque curve 82 and the second torque curve 86 that have been changed by the driving mode changing section 76.

In the present exemplary embodiment, the prediction section 54 delays the timing at which to predict the torque demand with the second torque curve 86 for which the driving mode changing section 76 has raised the torque upper limit value. Specifically, on the second torque curve 86 when the driving mode is the normal mode as illustrated by the double-dotted dashed line in FIG. 17, a peak position of the torque demand is estimated at a point in time when the motor torque is P1. However, in a state in which the driving mode has been changed such that the torque upper limit value of the second torque curve 86 has been raised as illustrated by the solid line in FIG. 17, a peak position of the torque demand is estimated at a point in time P2 when the torque is higher than at P1.

Next, explanation follows regarding operation of the motor drive system 70 according to the third exemplary embodiment. Motor drive control processing of the present exemplary embodiment is executed based on the flowchart illustrated in FIG. 5 similarly to in the first exemplary embodiment, and so explanation thereof is omitted. FIG. 18 is a flowchart illustrating an example of a flow of driving mode change processing by the motor drive control ECU 18. The driving mode change processing is executed by the CPU 20 reading the driving mode changing program 71 from the storage section 24 and executing this program. The driving mode change processing of the present exemplary embodiment is performed in cases in which the driver has instructed a driving simulation based on the eco mode. Note that in cases in which the remaining power is below a predetermined value, the driving mode change processing may be performed even if an instruction has not been received from the driver.

As illustrated in FIG. 18, at step 202, the CPU 20 acquires route information to a destination. Specifically, the CPU 20 acquires information regarding the destination and a route to the destination based on information registered in the navigation system or the like. In cases in which a destination has not been set, the CPU 20 may notify the occupant that driving simulation cannot be performed.

At step 204, the CPU 20 creates the drive force distribution plan based on the acquired route information. Specifically, using the functionality of the driving mode changing section 76, the CPU 20 splits up the route to the destination, and sets the first torque curve 82 and the second torque curve 86 for each journey segment.

At step 206, the CPU 20 notifies of the respective estimated arrival times and forecast remaining power. Specifically, using the functionality of the driving simulation section 78, the CPU 20 notifies the occupant of information regarding the estimated arrival times and remaining power based on both travel in the normal mode and travel in the eco mode. For example, the CPU 20 may notify by displaying the information on a monitor provided inside the vehicle cabin. An operation reception display allowing input as to whether or not the occupant consents to the eco mode may also be displayed on the monitor.

At step 208, the CPU 20 determines whether or not the eco mode has been selected. Specifically, in cases in which an operation to consent to the eco mode has been received, the CPU 20 makes an affirmative determination at step 208 and processing transitions to step 210. However, in cases in which an operation declining the eco mode has been received, or in cases in which a predetermined duration has elapsed since the operation reception display was performed, the CPU 20 makes a negative determination at step 208 and the driving mode change processing is ended.

At step 210, the CPU 20 changes the torque upper limit values for each journey segment. Specifically, the CPU 20 changes the torque upper limit value of the first torque curve 82 and the torque upper limit value of the second torque curve 86 for each journey segment based on the distribution plan created at step 204. The power consumption of the vehicle V during travel is thereby reduced compared to when in the normal mode.

At step 212, the CPU 20 determines whether or not divergence of the power consumption amount is greater than a threshold value. Specifically, the CPU 20 acquires the consumed power amount since the start of travel in the eco mode up to the current time. The CPU 20 then compares the power consumption amount when the drive force distribution plan was created at step 204 to the actual consumed power amount. In cases in which the divergence between the planned power consumption amount and the actual consumed power amount is greater than a predetermined threshold value, the CPU 20 makes an affirmative determination at step 212 and processing transitions to step 214. On the other hand, in cases in which the divergence between the planned power consumption amount and the actual power consumption amount is not greater than the predetermined threshold value, the CPU 20 makes a negative determination at step 212, and the processing of step 210 and step 212 is repeated until the vehicle V reaches its destination.

Note that the CPU 20 may perform the processing of step 212 for each journey segment. In such cases, for example, the power consumption amounts may be compared at switching timings between journey segments to compute the divergence. Alternatively, the CPU 20 may compare power consumption amounts to compute the divergence on an ongoing basis.

At step 214, the CPU 20 revises the drive force distribution plan. Specifically, using the functionality of the plan revision section 80, the CPU 20 revises the drive force distribution plan to the destination based on the current travel state of the vehicle V. For example, the CPU 20 may lower the drive force distributed to both the first MG 72 and the second MG 74 in order to extend the driving range.

At step 216, the CPU 20 notifies of the estimated arrival time and forecast remaining power after revising the plan. Specifically, the CPU 20 displays information regarding the estimated arrival time and the remaining power on the monitor provided inside the vehicle cabin. When this is performed, in cases in which determination has been made that the remaining power would otherwise be depleted before reaching the destination, the CPU 20 may display content on the monitor to propose changing the setting temperature of the air conditioning unit, switching off onboard devices, or the like. The power consumption amount increases in cases in which there is a large difference between the setting temperature of the air conditioning unit and the external temperature. The CPU 20 may therefore display a proposal to make the setting temperature closer to the external temperature so as to suggest to the occupant that the driving range possible with the remaining power could be extended. Similarly, the CPU 20 may display a proposal to switch off onboard devices including the air conditioning unit so as to suggest to the occupant that the driving range possible using the remaining power could be extended.

As described above, in the present exemplary embodiment, the driving mode changing section 76 changes the driving mode of the vehicle V by changing the first torque curve 82 and the second torque curve 86, thereby enabling the driving mode to be changed according to the preference of the driver, whether it be to prioritize fuel efficiency, prioritize acceleration performance, or the like.

The control section 56 of the present exemplary embodiment changes the carrier frequencies based on the first torque curve 82 and the second torque curve 86 changed by the driving mode changing section 76. This enables the control section 56 to suppress the generation of EMI noise by changing the carrier frequencies as appropriate, even in cases in which the respective torque curves of the first MG 72 and the second MG 74 have been changed as a result of changing the driving mode.

In the present exemplary embodiment, the driving mode changing section 76 lowers the torque upper limit values of the first torque curve 82 and the second torque curve 86, thereby enabling a change to a driving mode in which fuel efficient travel is prioritized. Conversely, when the driving mode changing section 76 raises the torque upper limit values of the first torque curve 82 and the second torque curve 86, a change can made to a driving mode in which acceleration performance during travel is prioritized.

In the present exemplary embodiment, the timing at which torque demand is predicted is delayed when the driving mode changing section 76 has raised the upper limit value of the first torque curve 82, such that the peak torque demand is predicted at a higher torque value, thereby enabling the peak position to be more accurately predicted. Similar applies to cases in which the driving mode changing section 76 has raised the upper limit value of the second torque curve 86.

In the present exemplary embodiment, the front wheels 68 of the vehicle V are driven by the first MG 72 and the rear wheels 66 thereof are driven by the second MG 74, thereby enabling the travel performance of the vehicle V to be improved compared to configurations in which only one set out of the front wheels 68 or the rear wheels 66 of the vehicle V are driven by a motor.

Note that although the third exemplary embodiment is configured such that two motors, these being the first MG 72 and the second MG 74, are respectively installed at the front and rear of the vehicle V, there is no limitation thereto. For example, an in-wheel motor serving as a first motor may be installed to the rear wheel on the left side of the vehicle V, and an in-wheel motor serving as a second motor may be installed to the rear wheel on the right side of the vehicle V. In such cases, the PCU 14 supplies drive signals modulated according to the carrier frequencies input by the motor drive control ECU 18 to the respective left and right in-wheel motors.

Alternatively, a motor drive system may be applied to a vehicle including three or more motors. For example, in-wheel motors may be installed to each wheel out of the left and right pair of front wheels and the left and right pair of rear wheels. In such cases, the PCU 14 supplies drive signals modulated according to the carrier frequencies input by the motor drive control ECU 18 to the four in-wheel motors.

An object of the present disclosure is to obtain a motor drive device and a motor drive method capable of reliably changing a carrier frequency in cases in which torque demand on a motor increases.

A first aspect of the present disclosure is a motor drive device that includes: a power control unit that drives a motor, which configures a motive power source of a moving body, by supplying a drive signal modulated according to a carrier frequency; a memory; and a processor that is coupled to the memory, the processor being configured to: predict torque demand on the motor, and change the carrier frequency of the power control unit in a case in which an increase in the torque demand on the motor has been predicted.

In the first aspect, the carrier frequency can be changed ahead of the actual increase in the torque demand on the motor, thereby enabling the carrier frequency to be reliably changed in cases in which the torque demand on the motor increases.

A second aspect of the present disclosure is the motor drive device of the first aspect, the processor being configured to change the carrier frequency to a new carrier frequency at which a probability that electromagnetic interference noise will be generated is lower than for the carrier frequency before the change, in a case in which an increase in the torque demand on the motor has been predicted.

In the second aspect, in cases in which an increase in the torque demand on the motor has been predicted, the carrier frequency is changed to a carrier frequency at which EMI noise from the motor is less liable to be generated, thereby enabling the generation of EMI noise to be suppressed in cases in which the torque demand on the motor increases.

A third aspect of the present disclosure is the motor drive device of the first or second aspect, wherein: the moving body is a vehicle; and the processor is configured to predict the torque demand on the motor based on at least one of an operation history of the motor, an accelerator position, a gradient of a road on which the vehicle is about to travel, or a weight of the vehicle.

In the third aspect, employing at least one out factor of the operation history of the motor, the accelerator position, the gradient of the road, or the weight of the vehicle enables the accuracy with which the torque demand on the motor is predicted to be improved.

A fourth aspect of the present disclosure is the motor drive device of any of the first to the third aspects, wherein: the processor is configured to predict a transition in the torque demand on the motor within a drive region of the motor, as defined by a torque curve expressing a relationship between rotation speed and torque of the motor, at least a high torque region of the drive region, in which the torque is a predetermined value or greater, is divided into a plurality of sub-regions arranged along an axis representing the rotation speed of the motor, and the carrier frequency is pre-set for each of the sub-regions, and the processor is further configured to change the carrier frequency by shifting a boundary position between the sub-regions so as to lower the carrier frequency at a predicted peak in the torque demand, in a case in which the predicted peak in the torque demand on the motor is within the high torque region.

In the fourth aspect, the lowering of the carrier frequency at the peak in order to suppress the generation of EMI noise in cases in which the peak torque demand on the motor enters the high torque region can be implemented by simple processing to shift the boundary position between the sub-regions.

A fifth aspect of the present disclosure is the motor drive device of the first aspect, wherein: the moving body is a vehicle, the power control unit drives a plurality of motors including a first motor and a second motor, and the processor is configured to: change a driving mode of the vehicle by changing a first torque curve expressing a relationship between rotation speed and torque of the first motor and a second torque curve expressing a relationship between rotation speed and torque of the second motor, and change the carrier frequency based on the changed first torque curve and the changed second torque curve.

In the fifth aspect, plural motors including the first motor and the second motor are driven. Accordingly, travel performance of the vehicle is improved in comparison to a vehicle with a single motor as a drive source. Moreover, the first torque curve and the second torque curve are changed in order to change the driving mode of the vehicle. This enables the driving mode to be changed according to the preference of the driver, whether it be to prioritize fuel efficiency, prioritize acceleration performance, or the like.

Note that the carrier frequency is changed based on the changed first torque curve and the changed second torque curve. This enables the generation of EMI noise to be suppressed by changing the carrier frequency as appropriate, even in cases in which the respective torque curves of the first motor and the second motor have been changed as a result of changing the driving mode.

A sixth aspect of the present disclosure is the motor drive device of the fifth aspect, wherein the processor is configured to change the driving mode by changing a torque upper limit of the first torque curve and a torque upper limit of the second torque curve.

In the sixth aspect, for example, by setting upper limit torque values, or by lowering the upper limit torque values, of the first torque curve and the second torque curve, a change can be made to a driving mode in which fuel efficient travel is prioritized. Conversely, by removing such upper limit torque values, or by raising the upper limit torque values, of the first torque curve and the second torque curve, a change can be made to a driving mode in which acceleration performance during travel is prioritized.

A seventh aspect of the present disclosure is the motor drive device of the sixth aspect, wherein the processor is configured to delay a timing at which the torque demand is predicted for at least one of the first torque curve or the second torque curve, in a case in which a torque upper limit value of the first torque curve or the second torque curve has been raised.

In the seventh aspect, for example, peak torque becomes a higher torque value in cases in which the upper limit value of the first torque curve has been raised. Accordingly, by delaying the timing at which the torque demand is predicted, the peak torque demand is predicted at a higher torque value, thereby enabling the peak position to be more accurately predicted. Similarly, in cases in which the upper limit value of the second torque curve has been raised, delaying the timing at which the torque demand is predicted enables the peak position to be more accurately predicted.

An eighth aspect of the present disclosure is the motor drive device of any of the fifth to seventh aspects, wherein the power control unit is configured to drive the first motor, which configures a motive power source of a front wheel of the vehicle, and the second motor, which configures a motive power source of a rear wheel of the vehicle.

In the eighth aspect, the front wheel of the vehicle is driven by the first motor, and the rear wheel of the vehicle is driven by the second motor. This enables the travel performance of the vehicle to be improved in comparison to configurations in which only one out of the first wheel or the rear wheel of the vehicle is driven by a motor.

The present disclosure exhibits the advantageous effect of enabling the carrier frequency to be reliably changed in cases in which the torque demand on the motor increases.

The invention claimed is:

1. A motor drive device, comprising:
a power control unit that drives a motor, which configures a motive power source of a moving body, by supplying a drive signal modulated according to a carrier frequency;
a memory; and
a processor that is coupled to the memory, the processor being configured to:
predict torque demand on the motor, and
change the carrier frequency of the power control unit in a case in which an increase in the torque demand on the motor has been predicted, wherein
the moving body is a vehicle; and
the processor is configured to predict the torque demand on the motor based on at least one of an operation history of the motor, an accelerator position, a gradient of a road on which the vehicle is about to travel, or a weight of the vehicle.

2. The motor drive device of claim 1, wherein the processor is configured to change the carrier frequency to a new carrier frequency at which a probability that electromagnetic interference noise will be generated is lower than for the carrier frequency before the change, in a case in which an increase in the torque demand on the motor has been predicted.

3. The motor drive device of claim 1, wherein:
the processor is configured to predict a transition in the torque demand on the motor within a drive region of the motor, as defined by a torque curve expressing a relationship between rotation speed and torque of the motor,
at least a high torque region of the drive region, in which the torque is a predetermined value or greater, is divided into a plurality of sub-regions arranged along an axis representing the rotation speed of the motor, and the carrier frequency is pre-set for each of the plurality of sub-regions, and
the processor is further configured to change the carrier frequency by shifting a boundary position between the plurality of sub-regions so as to lower the carrier frequency at a predicted peak in the torque demand, in a case in which the predicted peak in the torque demand on the motor is within the high torque region.

4. The motor drive device of claim 1, wherein
the processor is configured to predict the torque demand on the motor based on the gradient of the road on which the vehicle is about to travel.

5. The motor drive device of claim 1, wherein
the processor is configured to predict the torque demand on the motor based on the weight of the vehicle.

6. The motor drive device of claim 1, wherein
the processor is configured to
estimate a travel load value indicating upcoming transitions in a travel load of the vehicle, based on the operation history of the motor, and
predict the torque demand on the motor based on the estimated travel load value.

7. The motor drive device of claim 1, wherein
the processor is configured to
estimate an accelerator behavior value indicating upcoming transitions in the accelerator position, based on a history of the accelerator position,
estimate a travel load value indicating upcoming transitions in a travel load of the vehicle, based on the operation history of the motor, and
predict the torque demand on the motor based on the estimated accelerator behavior value and estimated travel load value.

8. A motor drive device, comprising:
a power control unit that drives a motor, which configures a motive power source of a moving body, by supplying a drive signal modulated according to a carrier frequency;
a memory; and
a processor that is coupled to the memory, the processor being configured to:
predict torque demand on the motor, and
change the carrier frequency of the power control unit in a case in which an increase in the torque demand on the motor has been predicted, wherein:
the moving body is a vehicle,
the power control unit drives a plurality of motors including a first motor and a second motor, and
the processor is configured to:
change a driving mode of the vehicle by changing a first torque curve expressing a relationship between rotation speed and torque of the first motor and a second torque curve expressing a relationship between rotation speed and torque of the second motor, and
change the carrier frequency based on the changed first torque curve and the changed second torque curve.

9. The motor drive device of claim 8, wherein the processor is configured to change the driving mode by changing a torque upper limit of the first torque curve and a torque upper limit of the second torque curve.

10. The motor drive device of claim 9, wherein the processor is configured to delay a timing at which the torque demand is predicted for at least one of the first torque curve or the second torque curve, in a case in which a torque upper limit value of the first torque curve or the second torque curve has been raised.

11. The motor drive device of claim 8, wherein the power control unit is configured to drive the first motor, which configures a motive power source of a front wheel of the vehicle, and the second motor, which configures a motive power source of a rear wheel of the vehicle.

12. A motor drive method by a motor drive device, the motor drive device including a power control unit that drives a motor, which configures a motive power source of a moving body, by supplying a drive signal modulated according to a carrier frequency, the motor drive method comprising:
predicting torque demand on the motor, and
changing the carrier frequency of the power control unit in a case in which an increase in the torque demand on the motor has been predicted, wherein
the moving body is a vehicle,
the power control unit drives a plurality of motors including a first motor and a second motor, and
the motor drive method comprising:
changing a driving mode of the vehicle by changing a first torque curve expressing a relationship between rotation speed and torque of the first motor and a second torque curve expressing a relationship between rotation speed and torque of the second motor, and
changing the carrier frequency based on the changed first torque curve and the changed second torque curve.

13. The motor drive method of claim 12, comprising changing the carrier frequency to a new carrier frequency at which a probability that electromagnetic interference noise will be generated is lower than for the carrier frequency before the change, in a case in which an increase in the torque demand on the motor has been predicted.

14. The motor drive method of claim 12, wherein
the predicting the torque demand on the motor is based on at least one of an operation history of the motor, an accelerator position, a gradient of a road on which the vehicle is about to travel, or a weight of the vehicle.

15. The motor drive method of claim 12, comprising:
predicting a transition in the torque demand on the motor within a drive region of the motor, as defined by a torque curve expressing a relationship between rotation speed and torque of the motor, wherein at least a high torque region of the drive region, in which the torque is a predetermined value or greater, is divided into a plurality of sub-regions arranged along an axis representing the rotation speed of the motor, and the carrier frequency is pre-set for each of the plurality of sub-regions, and
changing the carrier frequency by shifting a boundary position between the plurality of sub-regions so as to lower the carrier frequency at a predicted peak in the torque demand, in a case in which the predicted peak in the torque demand on the motor is within the high torque region.

16. The motor drive method of claim 12, comprising changing the driving mode by changing a torque upper limit of the first torque curve and a torque upper limit of the second torque curve.

17. The motor drive method of claim 16, comprising delaying a timing at which the torque demand is predicted for at least one of the first torque curve or the second torque curve, in a case in which a torque upper limit value of the first torque curve or the second torque curve has been raised.

18. The motor drive method of claim 12, wherein the power control unit is configured to drive the first motor, which configures a motive power source of a front wheel of the vehicle, and the second motor, which configures a motive power source of a rear wheel of the vehicle.

* * * * *